(12) United States Patent
Dey

(10) Patent No.: US 10,750,214 B2
(45) Date of Patent: *Aug. 18, 2020

(54) METHOD AND APPARATUS FOR MANAGING ACCESS PLANS

(71) Applicant: AT&T Intellectual Property I, L.P., Atlanta, GA (US)

(72) Inventor: Spondon Dey, Long Branch, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,702

(22) Filed: May 11, 2018

(65) Prior Publication Data
US 2018/0262788 A1 Sep. 13, 2018

Related U.S. Application Data

(63) Continuation of application No. 14/339,531, filed on Jul. 24, 2014, now Pat. No. 9,998,770, which is a
(Continued)

(51) Int. Cl.
H04N 21/20 (2011.01)
H04N 21/231 (2011.01)
H04N 21/2343 (2011.01)
H04N 21/235 (2011.01)
H04N 21/258 (2011.01)
H04N 21/4363 (2011.01)
H04N 21/4425 (2011.01)
H04N 21/63 (2011.01)
H04N 21/414 (2011.01)
(Continued)

(52) U.S. Cl.
CPC ..... *H04N 21/23439* (2013.01); *H04N 21/251* (2013.01); *H04N 21/25866* (2013.01); *H04N 21/41407* (2013.01); *H04N 21/43615* (2013.01); *H04N 21/43637* (2013.01); *H04N 21/454* (2013.01); *H04N 21/4516* (2013.01)

(58) Field of Classification Search
None
See application file for complete search history.

(56) References Cited

U.S. PATENT DOCUMENTS 6,628,934 B2   9/2003 Rosenberg et al.
7,869,369 B2   1/2011 Overcash
(Continued)

*Primary Examiner* — Brian T Pendelton
*Assistant Examiner* — Jean D Saint Cyr
(74) *Attorney, Agent, or Firm* — Guntin & Gust, PLC; Atanu Das

(57) ABSTRACT

A system that incorporates teachings of the present disclosure may include, for example, wirelessly receiving adjustment information from a mobile communication device, wirelessly receiving a request for video content from the mobile communication device, generating multiple versions of the video content, wirelessly transmitting a second version to the mobile communication device for presentation on the display device according to the adjustment of the access plan, and transmitting a first version to the mobile communication device for presentation on the display device and ceasing transmitting the second version responsive to a determination of an undesired condition associated with the presentation of the second version on the display device. Other embodiments are disclosed.

20 Claims, 5 Drawing Sheets

Related U.S. Application Data continuation of application No. 13/428,582, filed on Mar. 23, 2012, now Pat. No. 8,819,742, which is a continuation of application No. 12/337,196, filed on Dec. 17, 2008, now Pat. No. 8,156,530.

(51) Int. Cl.
*H04N 21/436* (2011.01)
*H04N 21/45* (2011.01)
*H04N 21/454* (2011.01)
*H04N 21/25* (2011.01)

(56) References Cited

U.S. PATENT DOCUMENTS

| | | |
|---|---|---|
| 7,920,494 B2 | 4/2011 | Stewart |
| 2002/0102985 A1 | 8/2002 | Amalfitano et al. |
| 2002/0154751 A1 | 10/2002 | Thompson, III et al. |
| 2003/0013434 A1 | 1/2003 | Rosenberg et al. |
| 2003/0028652 A1 | 2/2003 | Bardini et al. |
| 2003/0204613 A1 | 10/2003 | Hudson et al. |
| 2007/0157260 A1* | 7/2007 | Walker ............... H04N 7/163 725/86 |
| 2008/0022340 A1 | 1/2008 | Hannuksela et al. |
| 2008/0040121 A1 | 2/2008 | Wang et al. |
| 2008/0076421 A1 | 3/2008 | Schwarz |
| 2008/0081640 A1 | 4/2008 | Tran |
| 2008/0141313 A1 | 6/2008 | Kato |
| 2008/0233944 A1 | 9/2008 | Tu |
| 2008/0253444 A1 | 10/2008 | Ho |
| 2009/0028182 A1* | 1/2009 | Brooks ............ H04L 41/0896 370/466 |
| 2009/0102926 A1 | 4/2009 | Bhogal et al. |
| 2009/0217326 A1* | 8/2009 | Hasek .............. H04N 7/17336 725/87 |
| 2009/0240569 A1 | 9/2009 | Ramer et al. |
| 2010/0136952 A1 | 6/2010 | Rofougaran |
| 2012/0263398 A1* | 10/2012 | Martin-Cocher ........................ H04L 65/4023 382/299 |

\* cited by examiner

METHOD AND APPARATUS FOR MANAGING ACCESS PLANS

CROSS-REFERENCE TO RELATED APPLICATIONS

This application is a Continuation of and claims priority to U.S. patent application Ser. No. 14/339,531, filed Jul. 24, 2014 which is a Continuation of and claims priority to U.S. patent application Ser. No. 13/428,582, which is a Continuation of and claims priority to U.S. patent application Ser. No. 12/337,196 (now U.S. Pat. No. 8,156,530). All sections of the aforementioned application(s) and patent(s) are incorporated herein by reference in their entirety.

FIELD OF THE DISCLOSURE

The present disclosure relates generally to communication systems and more specifically to a method and apparatus for managing access plans.

BACKGROUND

There are a number of different types of communication devices and communication protocols that are capable of presenting media content, including video content such as movies. Users often have a number of these different devices at their disposal, including set top boxes, televisions, mobile devices, and desk top computers.

DETAILED DESCRIPTION

Figure 1:
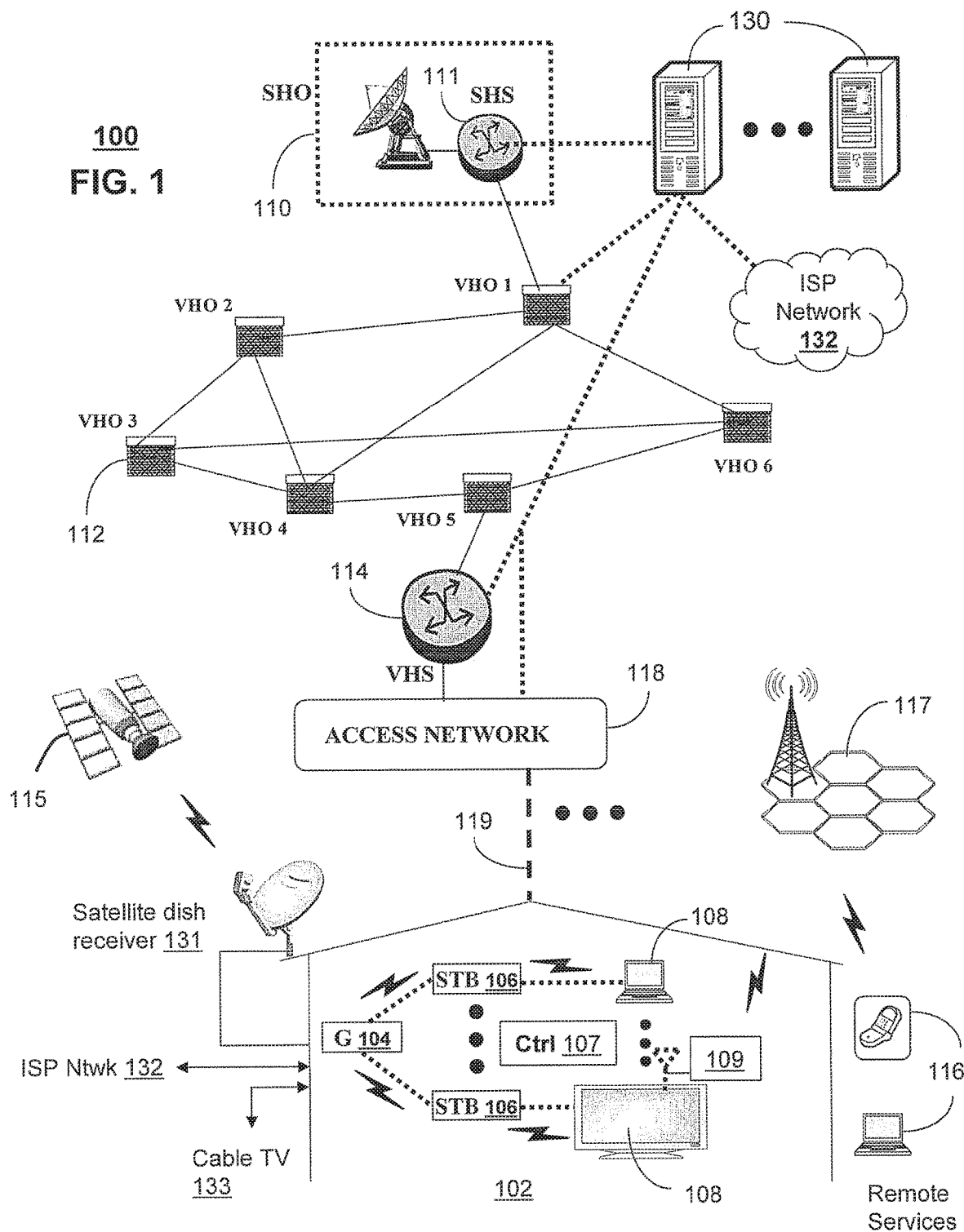
FIG. 1 depicts an illustrative embodiment of a communication system.

One embodiment of the present disclosure can entail a computer-readable storage medium of a television where the storage medium includes computer instructions to detect a mobile communication device that is capable of wirelessly receiving broadcast video content, determine an access plan associated with the mobile communication device, present on the television one or more options for adjusting the access plan where the one or more options include wireless access to the broadcast video content for the television, and receive a selection of the one or more options, where the access plan is adjusted based on the selection.

Another embodiment of the present disclosure can entail a mobile communication device including a controller to wirelessly receive broadcast video content from a service provider, provide access plan information to a television where the access plan information is associated with an access plan for the mobile communication device to the broadcast video content, receive adjustment information from the television where the adjustment information is associated with an adjustment to the access plan to provide wireless access for the television to the broadcast video content, and wirelessly transmit the adjustment information to the service provider for adjustment of the access plan.

Yet another embodiment of the present disclosure can entail a television including a controller to determine an access plan associated with a mobile communication device that is capable of wirelessly receiving broadcast video content, present one or more options for adjusting the access plan where the one or more options include wireless access for the television to the broadcast video content, and receive a selection of the one or more options, where the access plan is adjusted based on the selection.

Yet another embodiment of the present disclosure can entail a set top box operably coupled to a television. The set top box can include a controller to receive an access adjustment from the television where the access adjustment is associated with an adjustment to an access plan associated with a mobile communication device where the access plan allowing the mobile communication device to access broadcast video content from a service provider and where the adjustment including providing wireless access for the television to the broadcast video content, and provide the access adjustment to the service provider for adjustment of the access plan.

Yet another embodiment of the present disclosure can entail a method including determining an access plan associated with one of a mobile communication device and a television, the access plan allowing the one of the mobile communication device and the television to wirelessly access broadcast video content, presenting one or more options for adjusting the access plan where the one or more options including wireless access to the broadcast video content for the other of the mobile communication device and the television, and receiving a selection of the one or more options, where the access plan is adjusted based on the selection.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

In one embodiment, the display device 108 can be a TV having a controller 109 with a transceiver built therein for receiving media content directly from a mobile communication device 116. The media content can be in various forms, including video, video games, data, and so forth. The TV controller 109 and the device 116 can communicate using various protocols and techniques, including WiFi, WiMAX, Bluetooth, Long Term Evolution (LTE) and so forth. In one embodiment, the device 116 can detect or otherwise determine the communication and/or display capabilities of the TV 108 and can adjust the format of the media content accordingly. In another embodiment, the TV controller 109 and the mobile device 116 can be a multi-mode device and the mobile device can utilize a preferred mode of communication for transmitting the media content. In one embodiment, the mobile device 116 can receive the media content using LTE protocol, such as through use of a Single Carrier Frequency Division Multiple Access (SC-FDMA) uplink and Orthogonal Frequency Division Multiple Access (OFDMA) downlink with a base station transceiver. The LTE protocol can utilize discrete fourier transform signal processing to facilitate the communication with the mobile device 116.

In another embodiment, the LTE protocol can support multi-antenna techniques. For instance, multiple input and multiple output (MIMO), multiple input and single output (MISO), single input and single output (SISO), single input and multiple output (SIMO), network multiple input and multiple output (Net-MIMO) and/or multiple user multiple input and multiple output (MU-MIMO) can be employed for communication of the media content.

In one embodiment, the controller 109 can detect the presence and/or video capabilities of the mobile communication device 116. The controller 109 can determine the access plan associated with the device 109 and provide for adjustment of the access plan so that the controller can receive wireless video content from the mobile device and/or directly from the media source. The controller 109 can utilize the mobile device for transmitting information to adjust the access plan; can communicate directly with the service provider; and/or can communicate with the service provider through use of the STB 106. A user profile or the like can be utilized to facilitate the access plan adjustment, as well as format adjustments of the media content prior to delivery to the receiving device.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
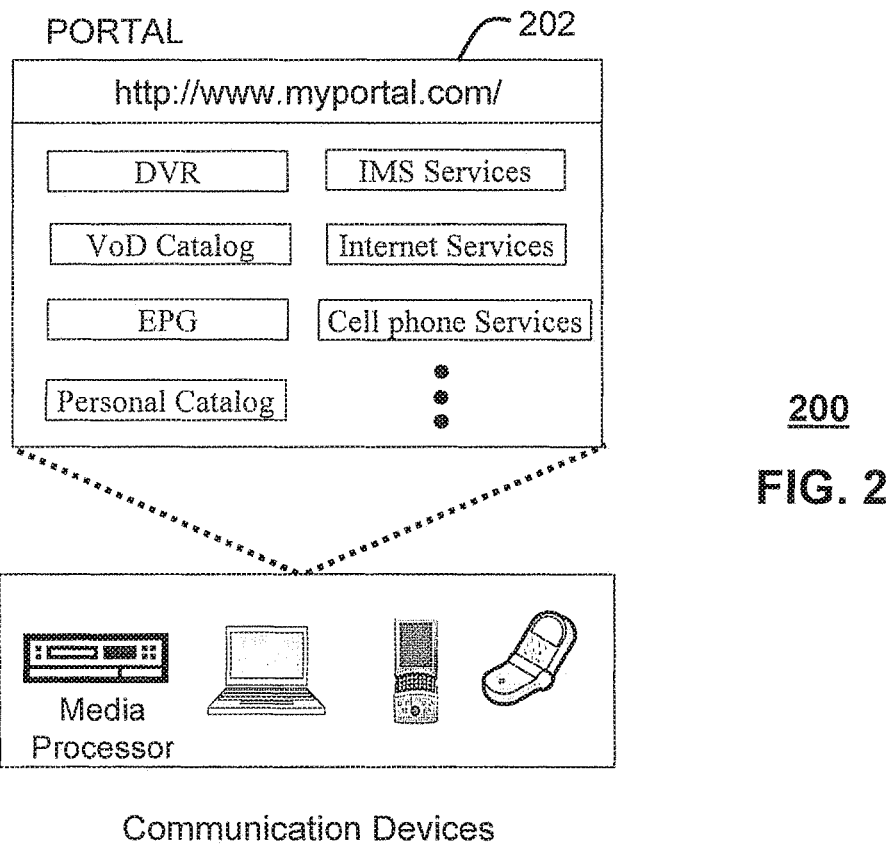
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 3:
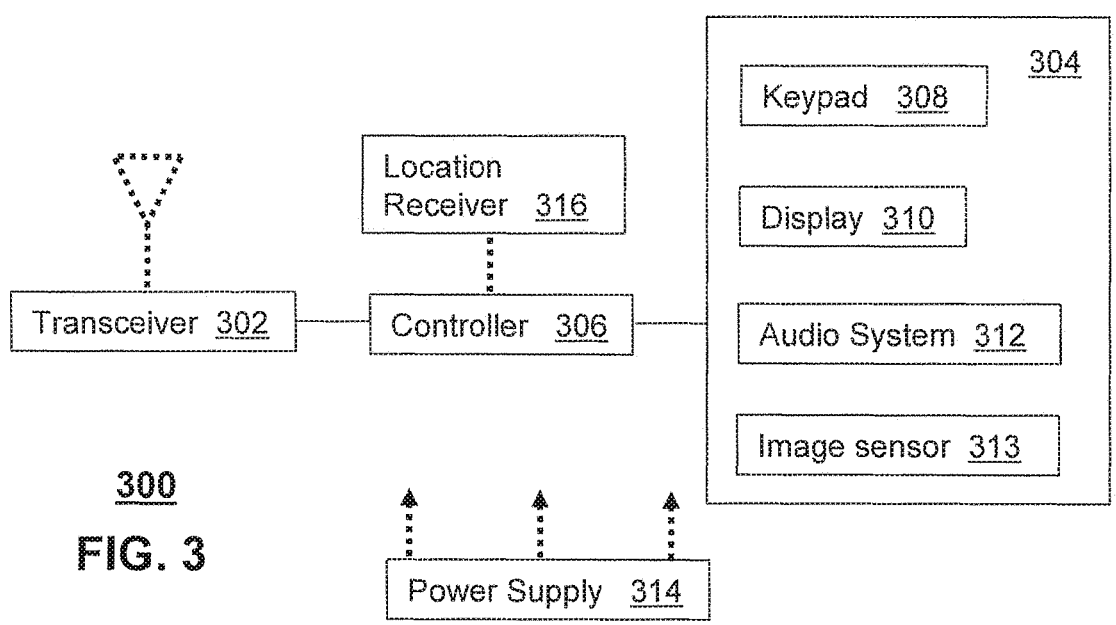
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VOIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
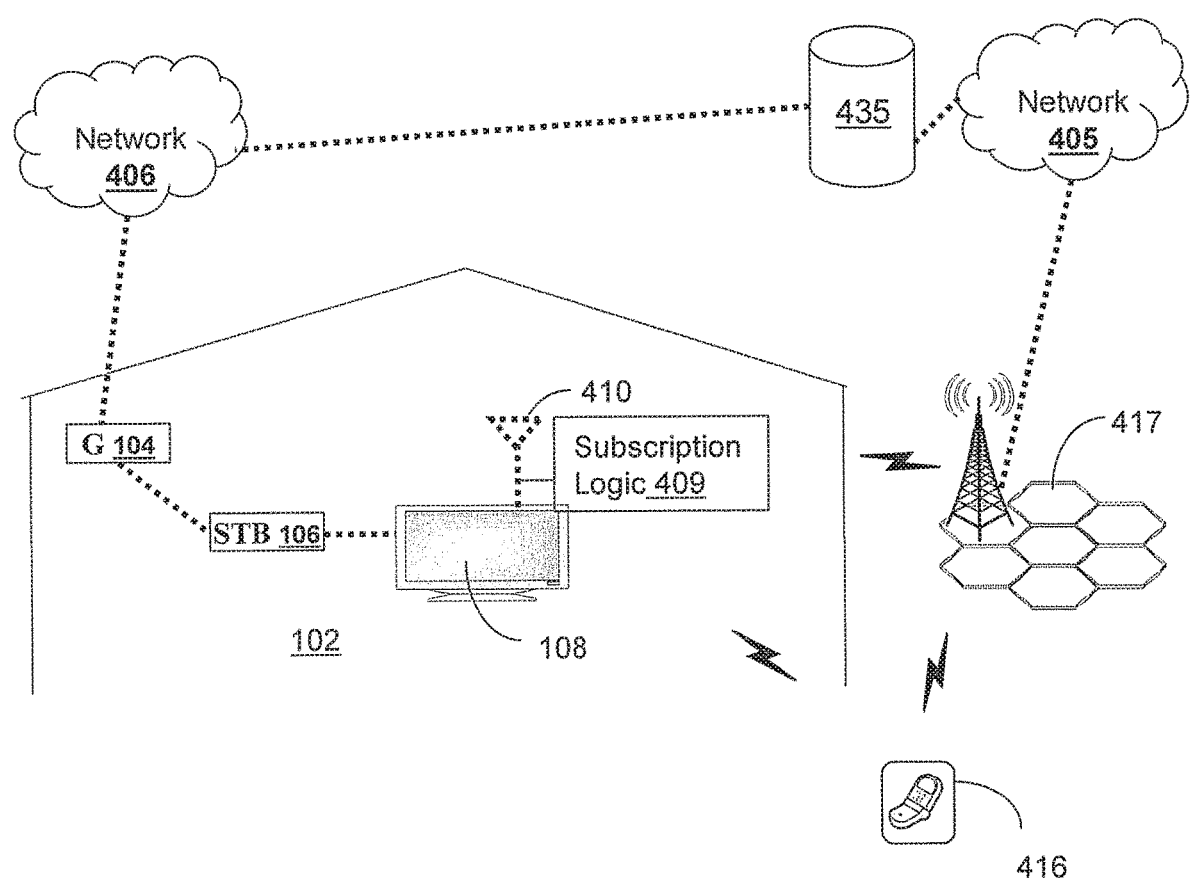
FIG. 4 depicts an illustrative embodiment of a communication system.

FIG. 4 depicts an exemplary embodiment of a communication system 400 for delivering media content. Communication system 400 can be overlaid or operably coupled with communication system 100 as another representative embodiment of said communication systems.

System 400 can include a user network, residence or other location 102 having a gateway 104, STB 106 and display device or TV 108. The STB 106 can be coupled to a media network 406, such as the IPTV network shown in FIG. 1 or one or more other media service provider networks including satellite, cable and so forth. The TV 108 can include a controller 409 incorporated into the TV and a transceiver 410 built therein for receiving media content from a mobile or hand held media device 416 having the ability to present the broadcast media content on its display device. In one embodiment, the transceiver 410 can be a multi-mode device capable of communicating using a number of protocols, including WiFi, Bluetooth, WiMax, OFDMA, SC-FDMA, LTE and so forth.

System 400 can utilize various protocols, techniques and combinations thereof for wirelessly broadcasting media content which is received by the hand held device 416 from a network 405 and towers 417, including LTE, WiMax, 3G, HSPA+ and so forth. The hand held device 416 can cache the media content upon receipt and then can begin streaming the media content from the cache in order to provide real time media content to the TV 108. System 400 can also utilize various protocols, techniques and combinations thereof for transmitting the requested media content to various points throughout the system, including use of an IPTV access network, the public Internet, and/or an IMS network. In one embodiment, the mobile device 416 and/or the controller 409 can selectively utilize communication protocols based on a number of factors including compatibility between the mobile device and the TV controller, signal quality or strength, type of media content, power consumption or efficiency and so forth.

A number of network devices, including DSLAM's, service routers and Ethernet switches, can be utilized for transporting the signals along and from the network 405 and/or 406, and can be provided in various areas of the provider network including intermediate offices, central offices and neighborhood offices. The network 405 and/or 406 can utilize a number of connection structures for providing a communication link with the communication devices, including twisted pair lines, fiber lines and/or wireless connections. In one embodiment, an IMS network can be coupled to or incorporated with a Universal Mobile Telecommunications System (UMTS) network, which can utilize various components, techniques and protocols for establishing wireless communication with the mobile device 416, such as W-CDMA. In one embodiment, the network 405 and the network 406 can be a single network that broadcasts the same media content to the STB 106 and the hand held device 416 using different protocols and different infrastructure but does so from the same media source.

In one embodiment, the hand held device 416 can have access to a database 435, which can be used for establishing and maintaining user profiles or other user information, including user access plans. The access plans can be associated with one or both of the TV 108 and the mobile device 416. The user profiles can be associated with one or more users of the network 405 and/or 406, as well as their communication devices. The user profiles can include device identification data, device and/or user preferences, format capabilities, wireless mode capabilities, service plans, and so forth. In one embodiment, the user profiles can include monitored behavior and viewing history of the user and/or user pre-selections, such as preferences inputted by the user in temporal proximity to a request to transmit media content to the TV 108.

In another embodiment, the user information or profiles can be imported in whole or in part from other sources, such as from a third party network, including previous service providers. In one embodiment, the user information or profiles can be a group storage for multiple users, such as users associated with a residence or a business entity, which has a plurality of individual user profiles associated with each of the users. While system 400 depicts the network 405 storing the user information or profiles in a centralized fashion in database 435, it should be understood by one of ordinary skill in the art that the present disclosure contemplates other configurations, including distributed configurations, being applied to system 400.

In one embodiment, the network 405 can provide for signal processing to be applied to the video content, such as according to an Advanced Television Systems Committee standard (ATSC) including the mobile handheld standard, so that code is embedded in the multiplex which develops lower profile versions of the main profile. In another embodiment, the standard can be based on or related to the ATSC Recommended Practice: E-VSB Implementation Guidelines, document ATSC A/112, which is the ATSC standards related to E-VSB (Enhanced Vestigial Sideband modulation), and which provides guidelines to parameter selection and implementation scenarios; the disclosure of which is incorporated herein by reference.

For example, the media content video data can be formatted using E-VSB or other multi-profiling formats with main and lower profile versions. The lower profile versions of the video stream can have a lower resolution but higher error correction data (such as Forward Error Correction data) in order to maintain a link with devices receiving a weak signal. In one embodiment, select one(s) of the profile versions can be provided to the mobile device 416 by the network 405 and/or by the mobile device to the TV 108 when there is a fault or potential fault determined during the broadcast and/or re-transmission. The fault monitoring can be performed by the network 405 or some other monitoring device, and/or can be performed by the receiving device(s) such as mobile device 416 and/or TV 108. The particular error correction technique utilized for the various profiles can vary and can include FEC, such as block coding, convolution coding, concatenate coding, turbo coding and so forth.

The exemplary embodiments can be performed by a single service provider or vendor, as well as through use of different service providers or vendors, including home and mobile services being different vendors where the service provider associated with the network 405 and/or 406 provides an agreed service coordination of benefit to the user.

In one embodiment, the TV 108 can directly receive the broadcast media content from the network 405 without the use of the mobile device 416 as an intermediary. The media content can be in various forms, including video, video games, data, and so forth. The TV controller 109 can receive the broadcast via LTE/WiMAX, 700 MHz signals, and so forth, such as from a base station tower of the network. The TV 108 can include an integrated transceiver enabling for direct wireless communication, including from long range communication protocols, as well as being an Internet-enabled device. In one embodiment, the TV controller 109 can retransmit the broadcast media content to other devices, such as other TV's or mobile devices, and can do so using a number of different modes of communication including wireline and wireless. In another embodiment, the controller 409 can selectively retrieve the media content from network 405, the mobile device 416 and/or the STB 106 based on parameters of the media content. For example, the controller 409 can monitor the quality of the video content and switch between the network 405 and the mobile device 416 to obtain a higher quality. Other parameters can also be used for determining which source of the media content to use, including the access plan, power consumption, network traffic and so forth.

Figure 5:
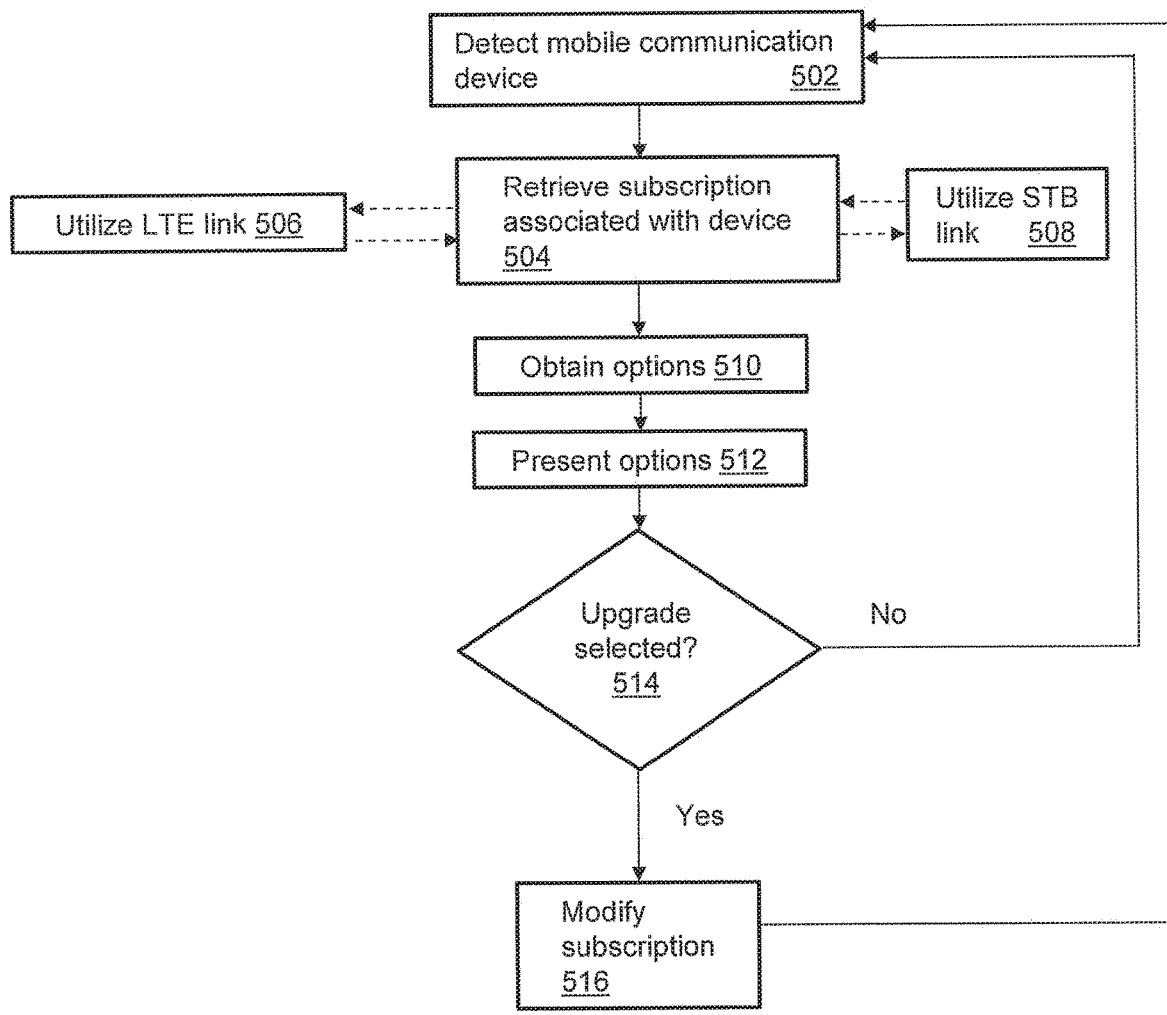
FIG. 5 depicts an illustrative embodiment of a method operating in portions of the communication systems of FIGS. 1 and 4.

FIG. 5 depicts an illustrative method 500 operating in portions of communication systems 100 and 400, including using mobile media device 416, TV controller 409 and STB 106 of system 400. Method 500 can begin with step 502 in which the TV 108 detects the presence of the mobile device 416. The detection can include determining whether the mobile device has the capability of wirelessly receiving and/or presenting broadcast video content. For instance, the mobile device 416 can be capable of wirelessly receiving broadcast media content using OFDMA protocol. In one embodiment, the media content can be broadcast from the network 405 using LTE protocol, where the mobile device 416 establishes a wireless link utilizing SC-FDMA protocol. In another embodiment, the detection of the mobile device 416 can be based on monitoring for LTE transmissions, such as SC-FDMA protocol communication being transmitted by the mobile device.

In step 504, the TV 108 can determine or otherwise retrieve the access plan (such as a paid subscription) or a portion thereof associated with the mobile device 416. In one embodiment in step 506, the TV 108 can utilize an LTE link with a service provider for communicating information associated with the access plan. In another embodiment in step 508, the TV 108 can communicate information associated with the access plan through use of a communication link with the STB 106.

In step 510, the TV 108 can determine or otherwise obtain one or more options for upgrading or otherwise adjusting the access plan. For example, the options can include allowing the TV 108 access to the broadcast video content directly from the network 405, allowing the TV access to the broadcast video content from the mobile device 416, and/or allowing access to the broadcast video content from both of the network and the mobile device. In one embodiment, the options can be based on monitored behavior associated with the mobile device. For example, a viewing history of the mobile device can indicate that sporting events are primarily viewed using the mobile device 416. The options can include providing access to the broadcast video content, but limited to sporting events. In another embodiment, a user profile can be utilized for generating the options. For instance, a user profile can indicate that the user does not desire to receive any offers for upgrades to his or her access plan. In this example, the TV 108 can then stop performing the remaining steps of method 500. In step 512, the options can be presented on the TV 108, such as through text, audio, or both.

In step 514, the TV 108 can determine whether an option has been selected by the user. The selection can be performed in a number of different manners. For example, a remote controller of the TV 108 can be used for making the selection. In one embodiment, voice recognition can be utilized for making the selection. If an upgrade option is not selected then method 500 can return to step 502. If on the other hand, an upgrade selection is made then in step 514 the access plan can be modified or adjusted based on the selected option.

In one embodiment, the mobile device 416 can reformat the media content for transmission to the TV 108. In another embodiment, the reformatted media content can be cached upon reformatting. For example, a determination of the appropriate format for the media content can be made. The mobile device 416 can be a multi-mode device that is capable of selecting a communication mode or protocol and transmitting the reformatted media content according to the selected protocol, such as Bluetooth, WiFi, and so forth. In one embodiment, the mobile device 416 can communicate with the TV 108 to obtain preferred protocols for transmitting the media content. In another embodiment, the determination of the preferred protocol can be based on a user profile associated with the TV 108 and/or the mobile device 416. For instance, the user profile can identify the preferred protocol or can identify criteria for determining the preferred protocol, such as based on time, power consumption, media content type, cost and so forth.

In one embodiment, the TV controller 409 can determine if the media content is available from another source, such as the STB 106. The availability determination can be based on a number of techniques, including searching an Electronic Program Guide. If the media content is available from the STB 106 or another source then a determination as to whether the media content from the mobile device 416 and/or directly from the network 405 has desired parameters can be made. The desired parameters can be a quality of the video content, power savings, adherence to Digital Rights Management requirements, cost savings (such as based on access and/or subscriber fees), and so forth. If the media content from the mobile device 416 and/or the network 405 has the desired parameters then it can be transmitted to the TV 108 for presentation otherwise the TV 108 can obtain the media content from the other source, such as the STB 106. In one embodiment, the TV controller 409 can monitor the parameters of the broadcast media content which is being presented on the TV 108 and can determine if the parameters no longer satisfy a parameter threshold. Upon a determination that the threshold is not being satisfied, the TV controller 409 can then retrieve the media content from another source, such as from the STB 106, directly from the network 405 and/or from the mobile device 416.

In one embodiment, the other media source, such as the STB 106, can be utilized as a supplemental source for streaming in the event that there is a link failure between the mobile device 416 and the TV 108 and/or the media content from the mobile device loses or otherwise no longer has the desired parameters. For example, the mobile device 416 can begin transmitting a broadcast movie to the TV 108 based on the quality of the video meeting a pre-determined threshold. The movie can be transmitted using E-VSB format with main and lower profiles. When a failure or otherwise undesired condition is detected then the lower profile version of the movie can be transmitted by the mobile device 416. If the lower profile version no longer meets the quality threshold then the TV 108 can begin obtaining the remaining portion of the movie from the STB 106. The media content being transmitted in system 400 can vary and can include video games and so forth.

In one embodiment, the user profiles can include monitored behavior data associated with the user and one or more of the user's communication devices, including the TV 108 and/or the mobile device 416. In one embodiment, parties that are not associated with a particular service provider but that participate in the transmission of the media content can have sub-profiles established within the user profile so that future retransmissions involving such parties can be enhanced, such as through video/audio data format adjustments. For instance, if a mobile hand-held device 416 of a third party is being utilized for retransmitting broadcast media content to the TV 108 then a sub-profile for that party and his or her device can be established so that any future retransmissions can be facilitated (including storing communication capabilities for the device).

In one embodiment, the format adjustment by the mobile device 416 can be based on receipt of the media content using an OFDMA scheme. The media content can then be reformatted by the mobile device 416 for transmission to the TV 108 using a SC-FDMA. In this example, the mobile device 406 can be capable of communicating with the network 405 (such as the base station transceiver) using SC-FDMA and can further communicate with the TV transceiver using the SC-FDMA.

In another embodiment, the format adjustment can include adjusting the communication protocol in combination with or instead of using multiple profile versions of the video content, such as through use of E-VSB. For example, the network 405 can transmit a video stream to the TV 108 and/or mobile device 416 with main and secondary profiles. In another embodiment, the mobile device 416 can receive the video stream containing main and secondary profiles, remove select profile versions, and transmit those select profile versions to the TV 108. In another embodiment, the mobile device 416 can receive the media content and generate the main and secondary profile versions for transmission to the TV 108. The amount of error correction and thus the resolution of the profile versions can be determined based on a number of factors, including user preferences in the user profiles and monitored network conditions, such as traffic or latency.

Upon reviewing the aforementioned embodiments, it would be evident to an artisan with ordinary skill in the art that said embodiments can be modified, reduced, or enhanced without departing from the scope and spirit of the claims described below. For example, the access plan can be associated with the TV 108 and the adjustment to the access plan can be based on adding the mobile device 416 to the plan so that both the TV and mobile device can receive the broadcast video content.

In one embodiment, the adjustment to the access plan can be temporary access, such as based on a particular amount of time or access to particular programming. In this example, the TV 108 and the mobile device 416 can be associated with different users, such as where a first user having access to desired video content through a mobile device 416 provides temporary access to a second user so that the video content can be displayed on the second user's TV. The present disclosure also contemplates the access plan adjustment not being limited in time.

Other suitable modifications can be applied to the present disclosure without departing from the scope of the claims below. Accordingly, the reader is directed to the claims section for a fuller understanding of the breadth and scope of the present disclosure.

Figure 6:
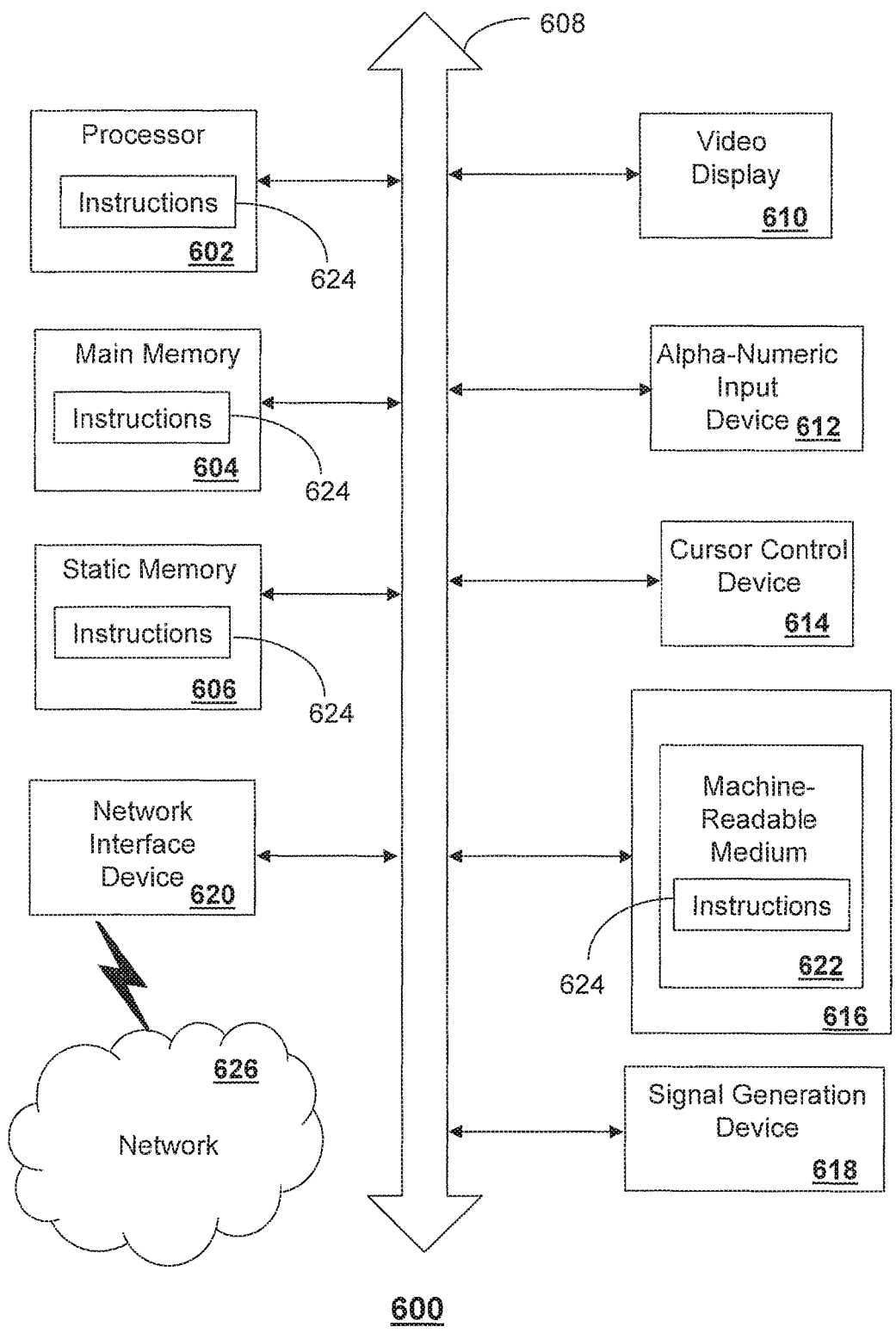
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network server comprising:
   a processing system including a processor; and
   a memory that stores executable instructions that, when executed by the processing system, facilitate performance of operations, comprising:

determining a viewing history of a mobile communication device;

receiving user-generated input from the mobile communication device to identify video content from a list of a plurality of video content that is generated based on an access plan for a user;

obtaining a first version of the video content according to the viewing history and monitored network conditions, wherein video data representing the video content is formatted to generate the first version of the video content;

transmitting the first version of the video content to the mobile communication device to enable the mobile communication device to provide the first version of the video content for presentation on a display device;

responsive to a first request for a content version change from the first version of the video content to a second version of the video content and a change in a transmission delivery path for the second version of the video content to the display device from the mobile communication device to a media processor communicatively coupled to the display device, retrieving the second version of the video content, wherein the video data representing the video content is formatted to generate the second version of the video content, wherein the second version of the video content differs in format from the first version of the video content;

determining a first communication protocol for transmitting the second version of the video content according to a type of the video content;

transmitting, to the media processor coupled to the display device, the second version of the video content using the first communication protocol for presentation on the display device; and ceasing transmitting the first version of the video content to the mobile communication device resulting in the display device ceasing to receive the first version of the video content from the mobile communication device.

2. The network server of claim 1, wherein the first request is based on a determination that the first version of the video content does not satisfy a quality criterion.

3. The network server of claim 2, wherein the quality criterion comprises a power consumption of the mobile communication device not satisfying a power consumption threshold, or the first version of the video content not satisfying a quality parameter threshold.

4. The network server of claim 1, wherein the transmitting the second version of the video content to the mobile communication device comprises transmitting the first version of the video content to the mobile communication device according to a second communication protocol to enable the mobile communication device to provide the first version of the video content to the media processor for presentation on the display device.

5. The network server of claim 2, wherein the operations comprise providing access plan information to the media processor, wherein the access plan information is associated with the access plan for the mobile communication device to access the video content.

6. The network server of claim 5, wherein the operations further comprise receiving adjustment information from the media processor, the adjustment information being associated with an adjustment to the access plan to provide wireless access for the media processor to the video content.

7. The network server of claim 1, wherein the operations further comprise receiving from the media processor a second request for another change in the transmission delivery path from the media processor to the mobile communication device.

8. The network server of claim 7, wherein the operations further comprise retransmitting, to the mobile communication device, the first version of the video content, wherein the mobile communication device provides the first version to the media processor for presentation on the display device.

9. A machine-readable storage medium, comprising executable instructions that, when executed by a processing system including a processor, facilitate performance of operations, comprising:

determining a viewing history of a mobile communication device;

receiving user-generated input from the mobile communication device to identify video content from a list of a plurality of video content that is generated based on an access plan for a user;

obtaining a first version of the video content according to the viewing history and monitored network conditions, wherein video data representing the video content is formatted to generate the first version of the video content;

determining a first communication protocol for transmitting the first version of the video content to the mobile communication device;

transmitting the first version of the video content to the mobile communication device according to the first communication protocol to enable the mobile communication device to provide the first version of the video content to a media processor for presentation on a display device coupled with the media processor;

receiving, from the media processor, a first request for a content version change from the first version of the video content to a second version of the video content and a change in a transmission delivery path for the second version of the video content to the display device from the mobile communication device to the media processor;

responsive to the first request, retrieving the second version of the video content from memory;

determining a second communication protocol for transmitting the second version of the video content according to a type of the video content, wherein the video data representing the video content is formatted to generate the second version of the video content, wherein the second version of the video content differs in format from the first version of the video content; and transmitting to the media processor the second version of the video content using the second communication protocol for presentation on the display device and ceasing transmitting the first version of the video content to the mobile communication device resulting in the display device ceasing to receive the first version of the video content from the mobile communication device.

10. The machine-readable storage medium of claim 9, wherein the first request is based on a determination that the first version of the video content does not satisfy a quality criterion.

11. The machine-readable storage medium of claim 10, wherein the quality criterion comprises a power consumption of the mobile communication device not satisfying a power consumption threshold, or the first version of the video content not satisfying a quality parameter threshold.

12. The machine-readable storage medium of claim 10, wherein the operations comprise providing access plan information to the media processor, wherein the access plan information is associated with the access plan for the mobile communication device to access the video content.

13. The machine-readable storage medium of claim 12, wherein the operations further comprise receiving adjustment information from the media processor, the adjustment information being associated with an adjustment to the access plan to provide wireless access for the media processor to the video content.

14. The machine-readable storage medium of claim 9, wherein the operations further comprise identifying a transit time to provide the video content from the mobile communication device.

15. The machine-readable storage medium of claim 14, wherein the first communication protocol is determined according to the transit time.

16. A method, comprising:
  determining, by a processing system including a processor, a viewing history of a mobile communication device;
  receiving user-generated input from the mobile communication device to identify video content from a list of a plurality of video content that is generated based on an access plan for a user;
  obtaining, by the processing system, a first version of the video content according to the viewing history and monitored network conditions;
  identifying, by the processing system, a transit time to provide the video content from the mobile communication device;
  determining, by the processing system, a first communication protocol for transmitting the first version of the video content to the mobile communication device according to the transit time;
  transmitting, by the processing system, the first version of the video content to the mobile communication device according to the first communication protocol to enable the mobile communication device to provide the first version of the video content to a media processor for presentation on a display device coupled with the media processor;
  receiving, by the processing system, from the media processor, a first request for a content version change from the first version of the video content to a second version of the video content and a change in a transmission delivery path for the second version of the video content from the mobile communication device to the media processor;
  responsive to the first request, retrieving, by the processing system, the second version of the video content from memory;
  determining a second communication protocol for transmitting the second version of the video content; and
  transmitting, by the processing system, to the media processor the second version of the video content using the second communication protocol for presentation on the display device and ceasing transmitting the first version of the video content to the mobile communication device resulting in the display device ceasing to receive the first version of the video content from the mobile communication device.

17. The method of claim 16, wherein the first request is based on a determination that the first version of the video content does not satisfy a quality criterion.

18. The method of claim 17, wherein the quality criterion comprises a power consumption of the mobile communication device not satisfying a power consumption threshold, or the first version of the video content not satisfying a quality parameter threshold.

19. The method of claim 17, further comprising providing, by the processing system, access plan information to the media processor, wherein the access plan information is associated with the access plan for the mobile communication device to access the video content.

20. The method of claim 19, further comprising receiving adjustment information from the media processor, the adjustment information being associated with an adjustment to the access plan to provide wireless access for the media processor to the video content.

* * * * *